US005629778A

United States Patent [19]
Reuman

[11] Patent Number: 5,629,778
[45] Date of Patent: May 13, 1997

[54] METHOD AND APPARATUS FOR REDUCTION OF IMAGE DATA COMPRESSION NOISE

[75] Inventor: Steven R. Reuman, Acton, Mass.

[73] Assignee: Polaroid Corporation, Cambridge, Mass.

[21] Appl. No.: 441,372

[22] Filed: May 15, 1995

[51] Int. Cl.[6] .................................................. H04N 1/415
[52] U.S. Cl. ........................................ 358/426; 358/261.1
[58] Field of Search ............................. 358/426–427, 358/261.1–261.3, 430–433; 382/232–233

[56] References Cited

U.S. PATENT DOCUMENTS

| | | | |
|---|---|---|---|
| 4,179,709 | 12/1979 | Workman | 358/133 |
| 4,754,492 | 6/1988 | Malvar | 382/41 |
| 5,054,103 | 10/1991 | Yasuda et al. | 382/56 |
| 5,162,923 | 11/1992 | Yoshida et al. | 358/433 |
| 5,168,375 | 12/1992 | Reisch et al. | 358/432 |
| 5,220,616 | 6/1993 | Downing et al. | 382/54 |
| 5,227,875 | 7/1993 | Suu et al. | 358/133 |
| 5,303,058 | 4/1994 | Fukuda et al. | 358/261.1 |
| 5,311,310 | 5/1994 | Jozawa et al. | 348/416 |
| 5,357,584 | 10/1994 | Yamaoka | 382/56 |
| 5,367,385 | 11/1994 | Yuan | 358/465 |
| 5,367,629 | 11/1994 | Chu et al. | 395/162 |
| 5,384,849 | 1/1995 | Jeong | 380/49 |
| 5,416,854 | 5/1995 | Fukuda et al. | 382/232 |
| 5,539,468 | 7/1996 | Suzuki et al. | 348/403 |

FOREIGN PATENT DOCUMENTS

| | | | |
|---|---|---|---|
| 0467054A2/A3 | 1/1992 | European Pat. Off. | H04N 7/133 |
| 0571171A2/A3 | 11/1993 | European Pat. Off. | H04N 7/13 |
| 0590922A2/A3 | 4/1994 | European Pat. Off. | H04N 1/41 |
| 5014735 | 1/1993 | Japan . | |
| WO95/15530 | 6/1995 | WIPO | G06F 17/14 |

OTHER PUBLICATIONS

Ngan et al., "Lowpass filtering in the cosine transform domain," ICC '80 Conference Record, vol. 2, 8 Jun. 1980, pp. 31.7.1–31.7.5.

H.S. Malvar et al, "Reduction of blocking effects in image coding with a lapped orthogonal transform," Proc. ICASSP '88, New York, 781–784 (1988).

G. Aharoni et al, "Local cosine transform—A method for the reduction of the blocking effect in JPEG," J. Math. Imaging and Vision, vol. 3, 7–38 (1993).

*Primary Examiner*—Stephen Brinich
*Attorney, Agent, or Firm*—Joseph Stecewycz

[57] ABSTRACT

An image encoding/decoding apparatus for performing transform coding by a method in which blocking artifacts are suppressed or eliminated is disclosed in which encoded data, transmitted by the encoding apparatus, is converted into received image data terms which are subsequently overlap transformed into frequency coefficients for modification by means of a filtering operation utilizing a quantization error matrix. The quantization error matrix can be derived from quantization error data generated in the encoding unit, or can be provided as a look-up table in the decoding unit. The modified frequency coefficients are converted into reduced-noise image data terms for reconstruction into a digital image.

52 Claims, 5 Drawing Sheets

METHOD AND APPARATUS FOR REDUCTION OF IMAGE DATA COMPRESSION NOISE

FIELD OF THE INVENTION

This invention relates to image processing and, more particularly, to a method and apparatus for reducing the effects of blocking artifacts which can be attributed to image data compression noise resulting from quantization-induced error in transform image coding processes.

BACKGROUND OF THE INVENTION

The image processing procedures of transform image coding is employed in various applications, including the electronic conversion of photographic images, the reproduction of graphical information in a printing operation, and the transmittal of digital image data by means of electronic communication systems. In such applications, the coding is performed upon an original source image which has been provided as a series of electrical image signals, where each signal corresponds to the characteristic of an element, or pixel, of the original source image. The electrical image signals are converted into a two-dimensional set of numerical values representing the source image pixels. A separate set of numerical values is provided for each color band used. For example, in a 'yuv' configuration three sets are provided, and the u- and v-sets are downsampled, as is well-known in the art, before further processing is performed.

These numerical values are commonly configured into a two-dimensional H×V array of image data terms. Each term in the image data array thus corresponds to a particular pixel in the original source image and quantitatively describes a feature characteristic of the pixel. In a standard display format, for example, the digital source image comprises an image data array of 640 columns and 480 rows of numerical values. Transform image coding generates a new set of H×V processed numerical values, commonly denoted as reconstructed image data terms, which have been computationally derived from the digital source image. The processed numerical values are converted into a new series of electrical signals from which a processed digital image can be generated.

Transform image coding procedures makes use of orthogonal transforms, such as the discrete cosine transform (DCT), to convert image data terms into frequency coefficient terms and thus simplify subsequent processing computations. Cosine transform image coding, for example, is an image processing procedure in which the digital source image terms are subjected to a two-dimensional forward discrete cosine transform (FDCT), the results divided by terms from a quantization table, and are entropy encoded by a process such as Huffman encoding. The encoded data is then stored or transmitted, usually much more efficiently than if the original image data terms had been used. The encoded data is subsequently decoded, multiplied by the quantization terms, and converted into reconstructed image data terms by the application of an inverse cosine transform (IDCT). A processed digital image is subsequently obtained from the reconstructed image data terms.

The orthogonal transforms applied in the process of transform image coding are commonly the FDCT and the IDCT. These transforms are applied in accordance with an industrial standard established by the Joint Photographic Experts Group (JPEG). The ISO Draft International Standard 10918-1 for JPEG is described in Appendix A of the reference text, "JPEG Still Image Data Compression Standard," by William B. Permebaker and Joan L. Mitchell. In accordance with the JPEG standard, a digitized source image is provided as a series of image-data matrices, usually formatted as 8×8 matrices, and the FDCT is applied to produce a series of frequency-coefficient matrices.

Conversion of an image-data matrix into a frequency-coefficient matrix by means of the two-dimensional FDCT can be expressed in shorthand matrix notation as, $$S(\upsilon,\mu) = C \times s(j,i) \times C^T$$

where, $S(\upsilon,\mu)$ are terms in the frequency coefficient matrix, $s(j,i)$ are terms in the image-data matrix, $C$ is the discrete cosine transform basis matrix, and $C^T$ is the transpose of $C$. The two-dimensional FDCT, as applied to 8×8 image-data matrices, is given by the equation, $$S(\nu,\mu) = \frac{1}{4} C_\nu C_\mu \sum_{j=0}^{7} \sum_{i=0}^{7} s(j,i) \cos\left[(2i+1)\frac{\mu\pi}{16}\right] \cos\left[(2j+1)\frac{\nu\mu}{16}\right]$$

where $$C_k = \frac{1}{\sqrt{2}}$$

for $k=0$ and $C_k=1$ for $k>0$. The frequency coefficient terms are, typically, divided by the quantization terms and the resulting quotients rounded, before transmittal or storage. The difference between the quotients as computed and the quotients as rounded is a source of computational error induced by the rounding operation. This results in image data compression noise which produces blocking artifacts at moderate to high compression levels.

Reconstructed image data terms are obtained by means of a two-dimensional IDCT operation, which can be expressed in shorthand matrix notation as, $$r(j,i) = C^T \times R(\upsilon,\mu) \times C$$

where $r(j,i)$ are reconstructed image data terms and $R(\upsilon,\mu)$ are dequantized frequency coefficient terms. The corresponding two-dimensional IDCT, as applied to 8×8 frequency coefficient matrices, is given by the equation, $$r(j,i) = \frac{1}{4} \sum_{\nu=0}^{7} \sum_{\mu=0}^{7} C_\nu C_\mu R(\nu,\mu) \cos\left[(2i+1)\frac{\mu\pi}{16}\right] \cos\left[(2j+1)\frac{\nu\pi}{16}\right].$$

Various methods of addressing the problem of blocking artifacts have been described in the relevant art. U.S. Pat. No. 4,754,492, issued to H. Malvar, discloses a method and apparatus for processing n-dimensional digitized signals containing at least two adjacent blocks of digitized sample values. The apparatus taught by the reference comprises a composite spatial operator utilizing basis functions similar to conventional DCT/IDCT basis functions, but which are characterized by slight extensions into the neighboring blocks in the input signal.

U.S. Pat. No. 5,220,616, issued to Downing et al., discloses a method of digitally processing images in which an image is compressed by dividing the corresponding image array into blocks which are subsequently transformed. Boundary discontinuities are smoothed by sequentially scanning image data elements at the boundaries with a one-dimensional operator matrix.

U.S. Pat. No. 5,357,584, issued to Yamaoka discloses an apparatus for compressing and expanding an image comprising an evaluation circuit for evaluating a predetermined compression factor and providing an optimum compression factor by comparing blocks of original image data with processed image data. The reference evaluation circuit comprises means for performing this comparison in each image data block, pixel by pixel, to provide block noise data.

In U.S. Pat. No. 5,367,385, issued to Yuan, there is disclosed a method and apparatus for processing block coded image data where pixel modification is performed by means of low pass filtering to reduce the difference in values between selected 'local' pixels near the borders of reconstructed pixel blocks and 'external' pixels near the block borders but in adjacent blocks.

A method and apparatus for removing blocking artifacts in which a blocking artifact measurer is included in the encoder unit is disclosed in U.S. Pat. No. 5,384,849, issued to Jeong. The blocking artifact measurer receives delayed original frame data and generates a frame data error corresponding to the difference between the original frame data and the received restored frame data.

There appears to be no transform image coding process disclosed in the prior art in which the reduction or elimination of blocking artifacts is accomplished by the modification of received frequency components. It is therefore an object of the present invention to provide an apparatus for performing image coding using a method that reduces blocking artifacts by filtering received frequency coefficients to compensate for the effects of quantization error.

It is a further object of the present invention to provide such a method and apparatus which can be used to reduce blocking artifacts in received JPEG-compliant image data files.

SUMMARY OF THE INVENTION

The present invention is an image encoding/decoding apparatus for performing transform coding by a method in which blocking artifacts are suppressed or eliminated. After transform image encoding has been performed, the encoded data is transmitted and converted into received image data terms which are subsequently overlap transformed into frequency coefficients for modification by means of a filtering operation utilizing a quantization error matrix. The quantization error matrix can be derived from quantization error data generated in the encoding unit, or can be provided as a look-up table in the decoding unit. The modified frequency coefficients are converted into reduced-noise image data terms for reconstruction into a digital image.

BRIEF DESCRIPTION OF THE DRAWINGS

The novel features that are considered characteristic of the present invention are set forth with particularity herein. The organization and method of operation of the invention, together with other objects and advantages thereof, will be best understood from the following description of the illustrated embodiments when read in conjunction with the accompanying drawings wherein.

DETAILED DESCRIPTION OF THE INVENTION

Figure 1:
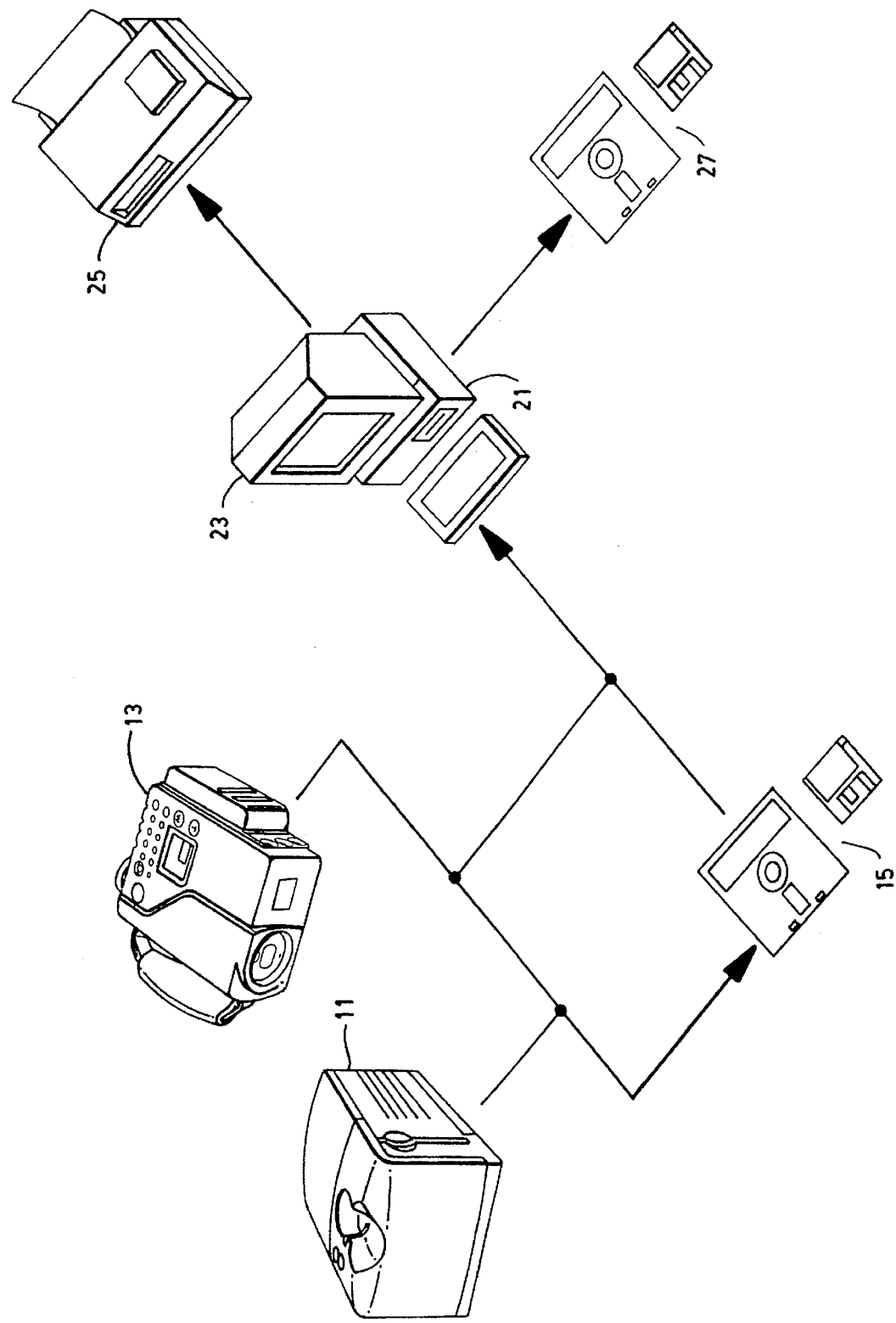
FIG. 1 is a diagrammatic illustration of a conventional image processing system used to perform image data compression by means of transform image encoding and decoding.

FIG. 1 is a diagram illustrating a conventional image processing system used to perform image data compression by means of transform image encoding and decoding. An original source image is converted into a digital source image comprising image data terms by means of an image digitizer, such as an optical scanner 11 or a video camera 13. The image data terms are either stored by means of an image-data disc 15 or similar storage medium, or sent directly to a transform image coding unit 21 for conversion into compressed image data. From the compressed image data, transform image coding unit 21 subsequently reconstructs a digital image which is sent to an image output unit such as a monitor 23 or a printing device 25. Alternatively, the compressed image data can be stored within unit 21, or be archived onto a compressed-data disc 27, or be transmitted to a remote image processing system for image reconstruction.

Figure 2:
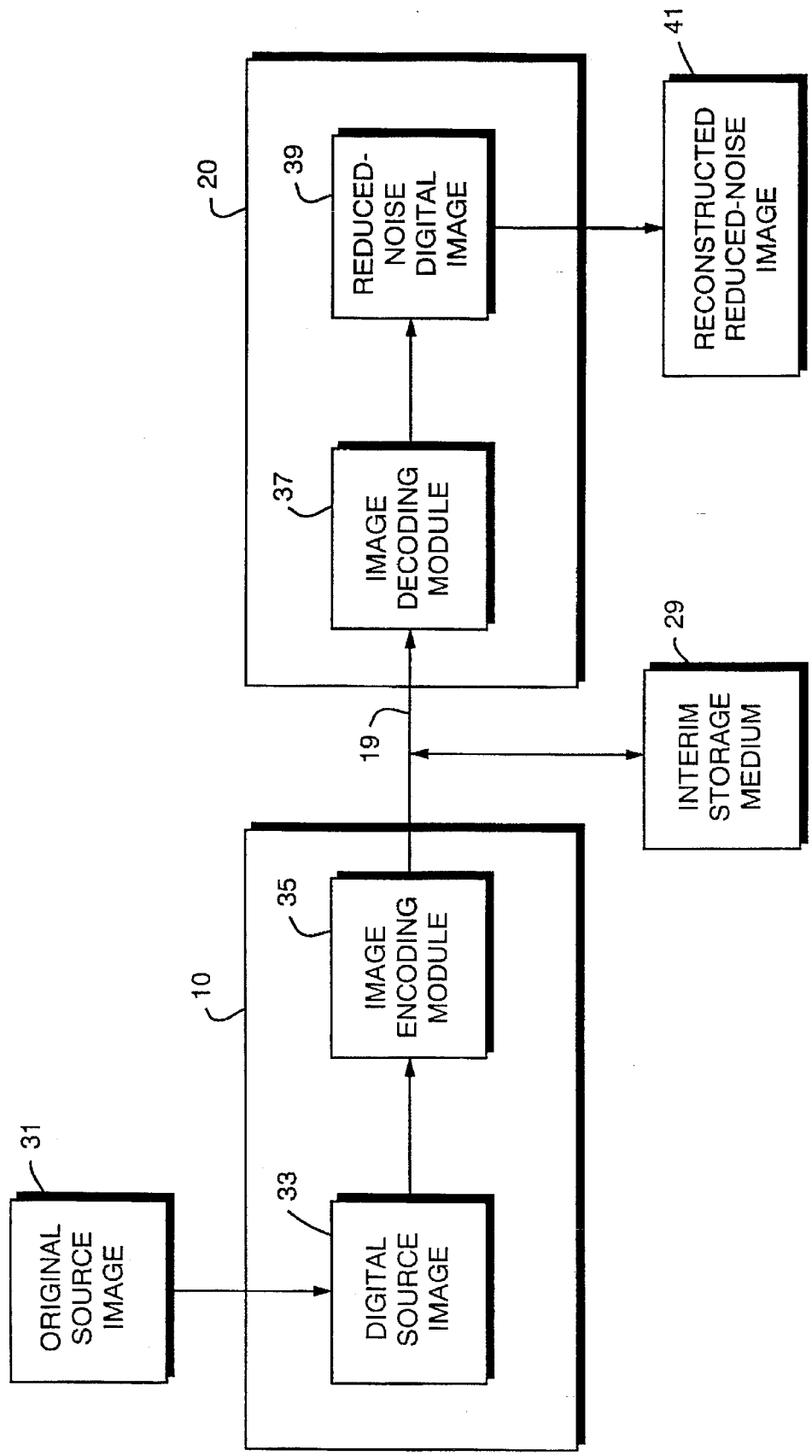
FIG. 2 is a functional block diagram illustrating the process by which an original source image is converted into a reconstructed reduced-noise image by means of an apparatus comprising image coding and decoding modules in accordance with the present invention.

In accordance with the present invention, an image encoding module 35 and an image decoding module 37, shown in FIG. 2, perform the image data compression and decoding functions of a conventional transform image coding unit. An image digitizer 10 converts an original source image 31 into one or more sets of color-band data, each of which is separately identified as a digital source image 33. Digital source image 33 is provided to image encoding module 35 as a two-dimensional H×V set of image data terms. Image encoding module 35 transforms digital source image 33 into compressed image data which is transmitted to image decoding module 37 by means of a transmission medium 19, which can be an electronic network or other communication system. The compressed image data is received by image decoding module 37 which transforms the compressed image data into a reduced-noise digital image 39. An image output unit 20 converts reduced-noise digital image 39 into a reconstructed reduced-noise image 41. In some applications, compressed image data produced by image encoding module 35 may be stored or archived in an interim storage medium 29, such as a magnetic disc, before being sent on to image decoding module 37.

Image Encoding Module

Figure 3:
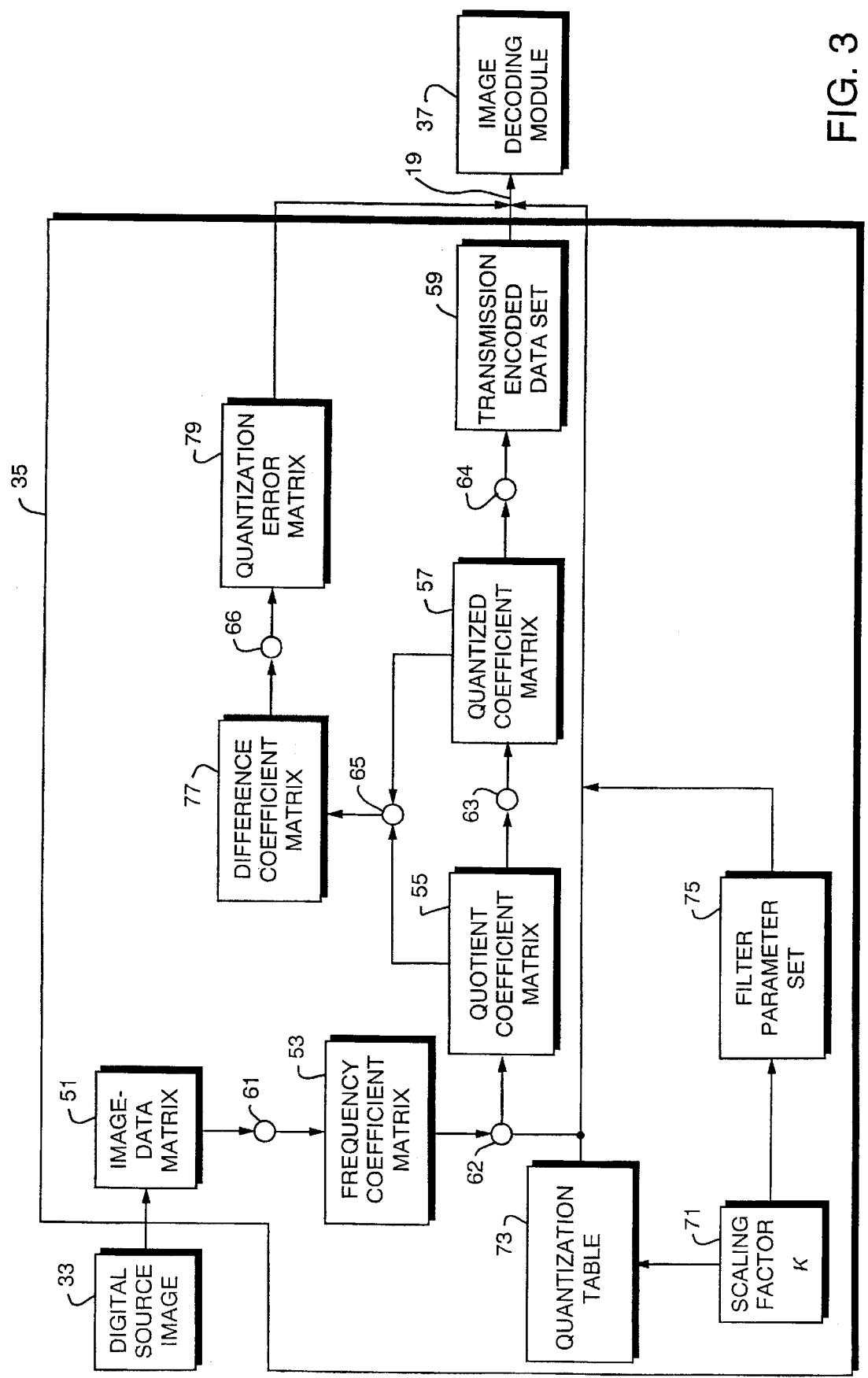
FIG. 3 is a block diagram illustrating the operational steps performed by the image encoding module of FIG. 2.

The processing operations performed by image encoding module 35 can best be described with reference to FIG. 3. Digital source image 33 comprises an H×V set of image data terms, denoted by $s_0(z,y)$. This set of image data terms is divided into a two-dimensional array of N×N image-data matrices 51 as is well-known in the art. Each image-data matrix 51 comprises $N^2$ terms denoted by $s(j,i)$, where $0 \leq i,j \leq N-1$. The image data terms comprising the image-data matrix located in the p-th column and the q-th row of the two-dimensional image-data matrix array can be determined from the equation, $$s_{q,p}(j,i) = s_0(j+Nq, i+Np)$$

where $0 < i+Np \leq H-1$ and $0 \leq j+Nq \leq V-1$.

Each image-data matrix 51 is transformed by means of an orthogonal transformation, at operation 61, into an N×N frequency-coefficient matrix 53 comprising frequency-coefficient terms $S_{q,p}(\upsilon,\mu)$, in accordance with the forward orthogonal transform equation, $$S_{q,p}(\upsilon,\mu) = C \times s_{q,p}(j,i) \times C^T$$

where $0 \leq \mu\upsilon \leq N-1$ and C is the forward transformation basis matrix.

The frequency coefficient terms $S(\upsilon,\mu)$ in frequency-coefficient matrix 53 are each divided by a corresponding scaled quantization term $Q(\upsilon,\mu)$, at operation 62, where the scaled quantization term is obtained from an N×N quantization table 73 used in conjunction with a scaling factor 71, denoted here as κ. The degree of image data compression performed by image encoding module 35 is proportional to the value of scaling factor 71. The value of scaling factor 71 is also used to determine the numerical values for filter parameters $\alpha_k$ and $\beta_k$, which are obtained from a look-up table in filter parameter set 75. For example, in a preferred embodiment, Table I specifies filter parameters $\alpha_k$ and $\beta_k$ for image-data bands y, u, and v, when a value for κ is given or determined. Filter parameter set 75 is transmitted to image decoding module 37 for use in the attenuation of quantization noise, as described in greater detail below.

TABLE I

| Values for α and β Given Scaling Factor κ | | | |
|---|---|---|---|
| κ | $\alpha_y, \beta_y$ | $\alpha_u, \beta_u$ | $\alpha_v, \beta_v$ |
| κ ≦ 8 | 0 | 0 | 0 |
| 8 < κ ≦ 24 | 1 | 2 | 2 |
| 24 < κ ≦ 32 | 2 | 4 | 4 |
| κ > 32 | 3 | 6 | 6 |

Execution of operation 62 produces a two-dimensional matrix array of N×N quotient-coefficient matrices 55, where the quotient-coefficient matrix in the p-th column and the q-th row of the matrix array comprises quotient terms $Qu_{q,p}(\upsilon,\mu)$ given by the equation $$Qu_{q,p}(\upsilon,\mu) = \frac{S_{q,p}(\upsilon,\mu)}{Q(\upsilon,\mu)}.$$

The quotient terms $Qu_{q,p}(\upsilon,\mu)$ are rounded to less precise values, at operation 63, to yield quantized-coefficient matrices 57 comprising quantized-quotient terms $Qc_{q,p}(\upsilon,\mu)$ given by the expression $$Qc_{q,p}(\upsilon,\mu) = \text{round}(Qu_{q,p}(\upsilon,\mu)) = \text{round}\left(\frac{S_{q,p}(\upsilon,\mu)}{Q(\upsilon,\mu)}\right).$$

An N×N difference-coefficient matrix 77 is derived at operation 65. Difference-coefficient matrix 77 contains difference terms $Dc_{q,p}(\upsilon,\mu)$ obtained by subtracting each quantized-quotient term $Qc_{q,p}(\upsilon,\mu)$ in quantized-coefficient matrix 57 from the corresponding quotient term $Qu_{q,p}(\upsilon,\mu)$ in quotient-coefficient matrix 55 in accordance with the equation, $$Dc_{q,p}(\upsilon,\mu) = abs\left[\left(\frac{S_{q,p}(\upsilon,\mu)}{Q(\upsilon,\mu)}\right) - \text{round}\left(\frac{S_{q,p}(\upsilon,\mu)}{Q(\upsilon,\mu)}\right)\right].$$

A series of difference-coefficient matrices 77 are derived, one for each frequency-coefficient matrix 53 in the matrix array. The difference-coefficient matrices 77 are summed, averaged, and multiplied by a corresponding quantization term, at operation 66, to produce an N×N quantization error matrix 79 comprising terms $E_0(\upsilon,\mu)$ derived in accordance with the equation, $$E_0(\upsilon,\mu) = Q(\upsilon,\mu) \sum_q \sum_p \frac{Dc_{q,p}(\upsilon,\mu)}{M}$$

where M is the total number of difference-coefficient matrices 77 summed. Alternatively, quantization error matrix 79 comprises terms $E_1(\upsilon,\mu)$ derived as root-mean-square error terms in accordance with the equation, $$E_1(\upsilon,\mu) = Q(\upsilon,\mu) \sqrt{\sum_q \sum_p \frac{(Dc_{q,p}(\upsilon,\mu))^2}{M}}$$

Each quantized-coefficient matrix 57 is transmission-encoded, at operation 64, by a process such as zig-zag sequencing with Huffman encoding, to yield a transmission-encoded data set 59. Transmission-encoded data set 59 is then transmitted to image decoding module 37 via transmission medium 19. Quantization error matrix 79, filter parameter set 75, and quantization table 73 are similarly transmitted to image decoding module 37 via transmission medium 19.

Image Decoding Module

Figure 4:
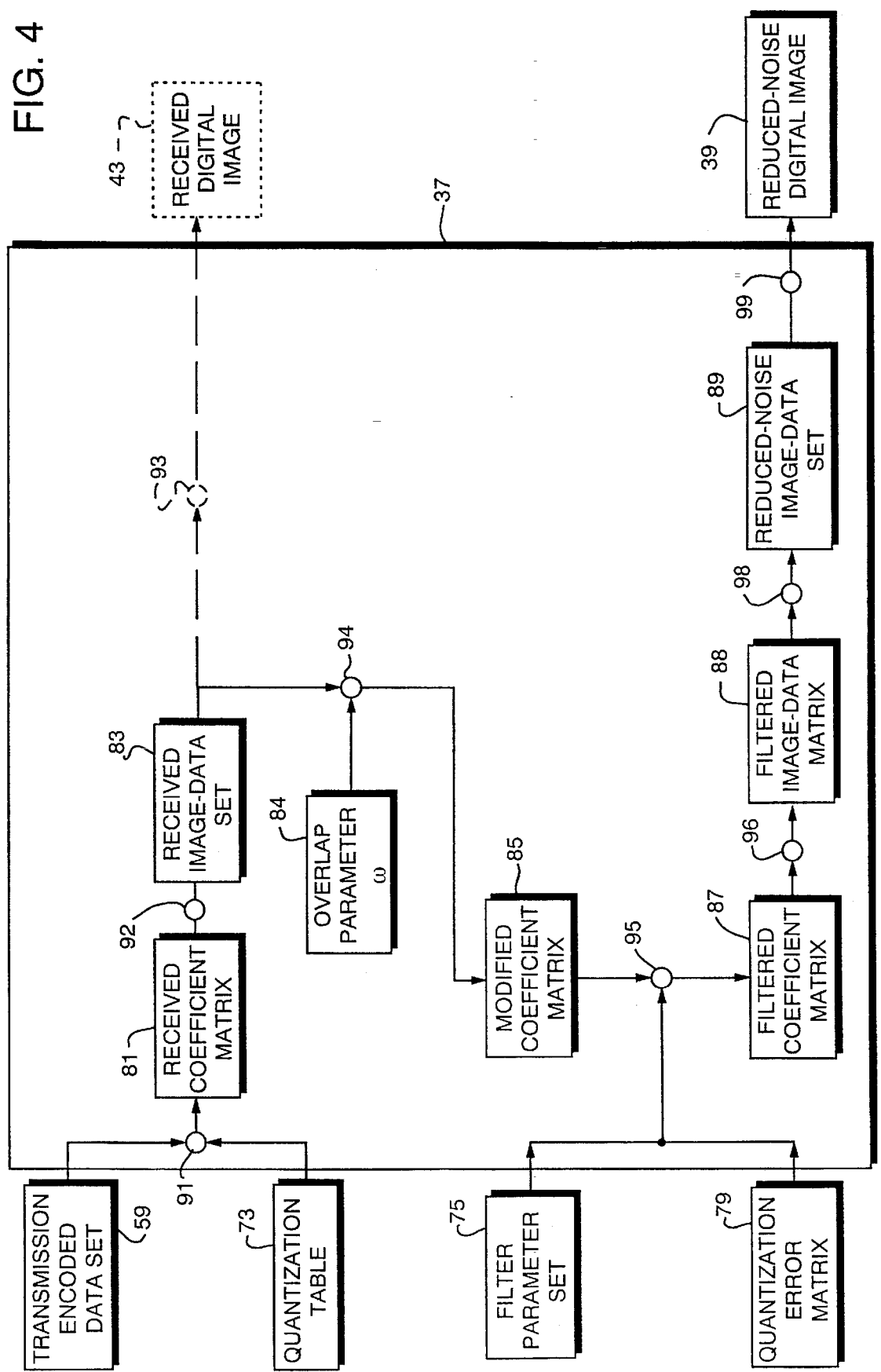
FIG. 4 is a block diagram illustrating the operational steps performed by the image decoding module of FIG. 2.

The image processing operations performed by image decoding module 37 can best be described with reference to FIG. 4. Transmission-encoded data set 59 is decoded into a set of received quantized transform coefficients, denoted by $Sr_{q,p}(\upsilon,\mu)$. Each received coefficient $Sr_{q,p}(\upsilon,\mu)$ is mask multiplied by the corresponding scaled quantization term from quantization table 73 to produce a mask-multiplied transform coefficient $R_{q,p}(\upsilon,\mu)$, at operation 91, in accordance with the equation, $$R_{q,p}(\upsilon,\mu) = Sr_{q,p}(\upsilon,\mu) \times Q(\upsilon,\mu)$$

Execution of operation 91 yields a series of N×N received coefficient matrices 81 comprising mask-multiplied transform coefficients $R_{q,p}(\upsilon,\mu)$, where each transform coefficient $R_{q,p}(\upsilon,\mu)$ corresponds to a quantized-quotient term $Qc_{q,p}(\upsilon,\mu)$ previously processed in image encoder module 35.

At operation 92, an inverse orthogonal transform is used to convert transform coefficients $R_{q,p}(\upsilon,\mu)$ into received image data terms denoted by $r_{q,p}(j,i)$, in accordance with the inverse transform equation, $$r_{q,p}(j,i) = C^* \times R_{q,p}(\upsilon,\mu) \times C$$

Each received image data term $r_{q,p}(j,i)$ corresponds to an image data term $s_0(z,y)$ from H×V digital source image 33. Accordingly, received image data terms $r_{q,p}(j,i)$ can be formatted into an H×V received image-data set 83 comprising terms denoted by $s_R(z,y)$. This formatting is accomplished in accordance with the equation, $$S_R(j+Nq, i+Np) = r_{q,p}(j,i)$$

where $0 \leq i+Np \leq H-1$ and $0 \leq j+Nq \leq V-1$.

In a conventional image decoding system, received image data set 83 would next be reconstructed, at conventional operation 93, to form a received digital image 43, denoted by phantom lines. It is received digital image 43 which commonly exhibits blocking artifacts at moderate to high ratios of image compression. The blocking artifacts result from errors introduced by the quantization of quotient terms at operation 63 in image encoding module 35. One procedure employed to solve this problem of quantization noise is to reduce scaling factor 71 such that the quantization performed on the quotient terms is decreased and the occurrence of blocking artifacts is reduced. However, this approach is undesirable because a lesser degree of image data compression results and the computational resources and transmission time required to process the compressed data are correspondingly increased.

The present invention suppresses or eliminates the occurrence of blocking artifacts by means of a corrective process which compensates for the errors introduced by the prior quantization operation. In accordance with the disclosed method, the terms $s_R(z,y)$ comprising received image-data set 83 are modified by a filtering process before a digital image is reconstructed. The filtering is accomplished by means of the following sequence of operations: i) overlap-transforming the terms $s_R(z,y)$ of received image-data set 83 into the frequency domain to form a two-dimensional array of N×N modified frequency-coefficient matrices 85, at operation 94, ii) filtering the modified frequency-coefficient matrices 85 to produce a series of filtered coefficient matrices 87, at operation 95, iii) inverse transforming the filtered coefficient matrices 87 into the spatial domain to produce a filtered image-data matrix 88, at operation 96, iv) extracting selected reduced-noise terms from filtered image-data matrices 88 to form a two-dimensional reduced noise image-data set 89 at operation 98, and v) forming reduced-noise digital image 39, from reduced-noise image-data set 89 at operation 99.

Overlap-transformation of received image-data set 83, at operation 94, refers to the process of applying a forward orthogonal transformation to an array of N×N matrices which have been obtained from image-data set 83 by an 'overlap' process. The image data terms comprising these overlapped image-data matrices are obtained from received image-data matrix set 83 in accordance with the equation, $$v_{s,r}(j,i) = S_R(j+\omega s, i+\omega r)$$

where $1 \leq \omega \leq N-1$, $0 \leq j+\omega s \leq V$ and $0 \leq i+\omega r \leq H$. The image data terms comprising the overlapped image-data matrix in the r-th column and s-th row of the overlapped image-data matrix array are denoted by $v_{s,r}(j,i)$. The amount of overlap used in the overlap procedure is determined by the value of integer constant which is an overlap parameter 84 provided by image decoding module 37. In a preferred embodiment, $\omega$ is set to $$\frac{N}{2}.$$

It can be seen that application of the overlapping process results in a matrix array in which certain rows and columns of image data terms are common to corresponding pairs of overlapped image-data matrices. For example, $$v_{s+1,r}(j,i) = v_{s,r}(j+N-\omega,i) \text{ and } v_{s,r+1}(j,i) = v_{s,r}(j,i+N-\omega)$$

for $0 \leq i,j \leq \omega-1$. By applying a filtering operation to image-data matrices which overlap one another, matrix-to-matrix discontinuities are avoided and the occurrence of blocking effects is suppressed or eliminated.

The overlapped image-data matrices are converted, by means of the forward orthogonal transformation, into N×N modified coefficient matrices 85 comprising modified frequency-coefficient terms $Sv_{s,r}(\upsilon,\mu)$ given by the matrix equation $$Sv_{s,r}(\upsilon,\mu) = C \times v_{s,r}(j,i) \times C^T$$

A filtering computation, utilizing filter parameter set 75 and quantization error matrix 79, is performed upon the modified coefficient matrices, at operation 95, to yield N×N filtered coefficient matrices 87, comprising filtered frequency-coefficient terms $Sf_{s,r}(\upsilon,\mu)$, obtained in accordance with the equation $$Sf_{s,r}(v,\mu) = [Sv_{s,r}(v,\mu)] \times \left[ \frac{[Sv_{s,r}(v,\mu)]^2}{[Sv_{s,r}(v,\mu)]^2 + \alpha \, [E_X(v,\mu)]^2} \right]^\beta.$$

Numerical values for $\alpha$ and $\beta$ are obtained from filter parameter set 75 and $E_X(\upsilon,\mu)$ is quantization error matrix 79, such as $E_0(\upsilon,\mu)$ or $E_1(\upsilon,\mu)$ defined above.

Filtered coefficient matrices 87 are transformed into filtered image-data matrices 88 comprising filtered image data terms denoted by $rf_{s,r}(j,i)$, at operation 96, by the application of an inverse orthogonal transform in accordance with the matrix equation, $$rf_{s,r}(j,i) = C^T \times Sf_{s,r}(\upsilon\mu) \times C$$

Because of the overlapping procedure performed at operation 94, each filtered image-data matrix 88 contains more image data terms than is necessary to obtain reduced-noise digital image 39. Accordingly, image data terms lying only within an N'×N' core submatrix rk(m,n) of each filtered image-data matrix are extracted and combined to form a two-dimensional H×V reduced-noise image-data set 89 at operation 98, where $0 \leq m,n \leq N'-1$, where $N'=N-\omega$, and where $\omega$ is overlap parameter 84.

Each core submatrix $rk_{s,r}(m,n)$ is obtained by deleting the image data terms in rows 0 through $$\left( \frac{\omega}{2} - 1 \right)$$

and $$\left( N - \frac{\omega}{2} \right)$$

through (N−1), and the filtered image data terms in columns 0 through $$\left( \frac{\omega}{2} - 1 \right)$$

and $$\left( N - \frac{\omega}{2} \right)$$

through (N−1) of a corresponding filtered image data matrix $rf_{s,r}(j,i)$. The relationship between core submatrix terms $rk_{s,r}(n,m)$ and filtered image data terms in the corresponding filtered image-data matrix $rf_{s,r}(j,i)$ is given by the expression, $$rk_{s,r}\left(j-\left(\frac{\omega}{2}\right),i-\left(\frac{\omega}{2}\right)\right)=rf_{s,r}(j,i)$$

for $$\left(\frac{\omega}{2}\right)\leq i,j\leq N-\left(\frac{\omega}{2}+1\right).$$

Reduced-noise image-data set 89 is formed by combining the core matrix terms into a two-dimensional H×V array in accordance with the equation, $$S_F(n+sN',m+rN')=rk_{s,r}(n,m).$$

where $0\leq m+rN'\leq H-1$ and $0\leq n+sN'\leq V-1$. Reduced-noise image-data set 89, which corresponds to received image-data set 83, is reconstructed, at operation 99, to form reduced-noise digital image 39. In comparison to conventionally-obtained received digital image 43, the effects of blocking artifacts attributable to quantization have been reduced or eliminated in reduced-noise digital image 39 as a consequence of filtering operation 95.

Image Decoding Module—Alternative Embodiment

Figure 5:
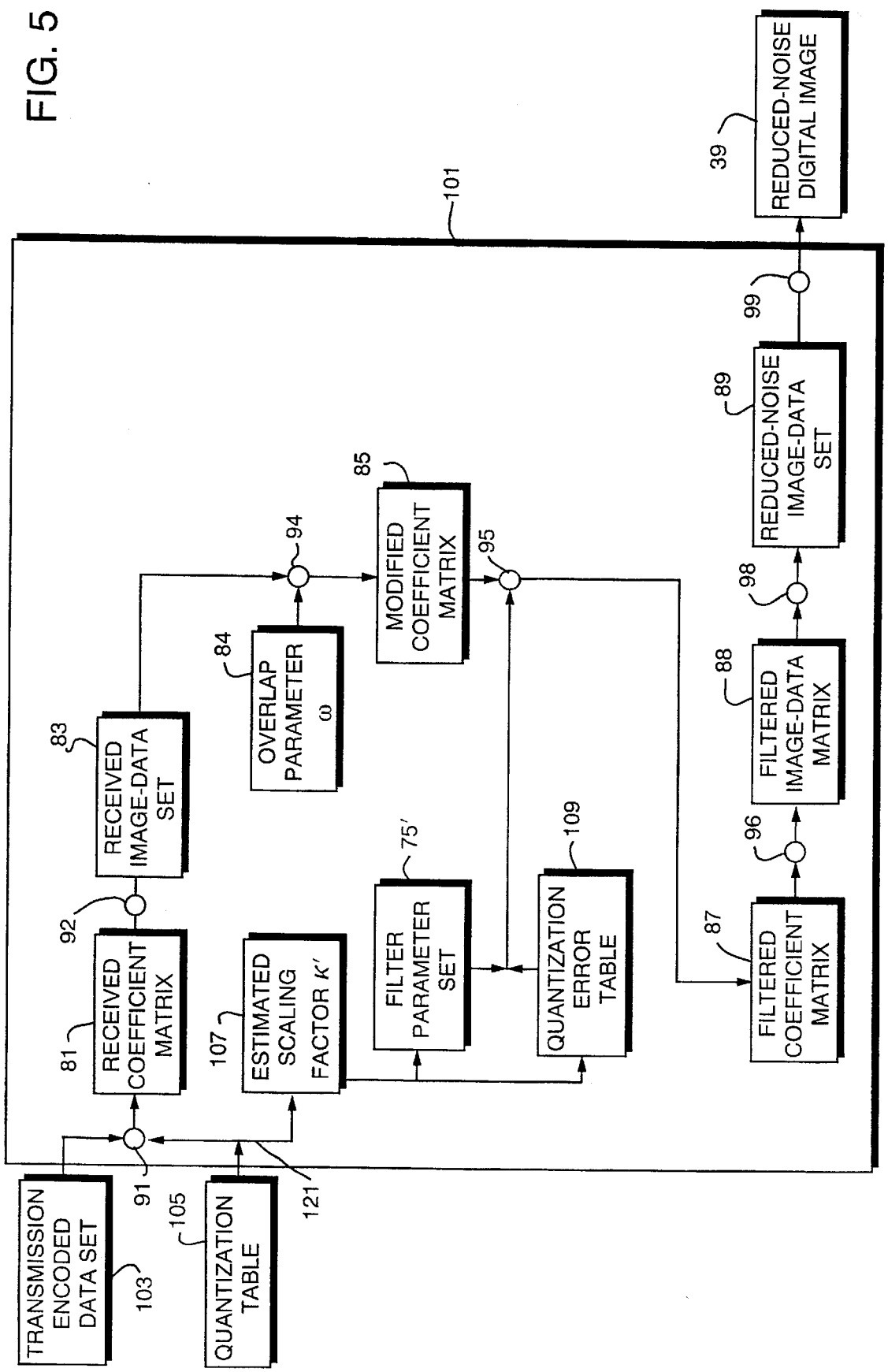
FIG. 5 is an alternative embodiment of the image decoding module of FIG. 4.

For image processing applications in which a transmission encoded data set 103 has been provided by a conventional image encoding module, such as a module configured to output JPEG-compliant data, decoding is accomplished by means of an alternative image decoding module 101, shown in FIG. 5. Typically, the conventional image encoding module provides a quantization table 105, but no quantization error matrix or filter parameters, via transmission medium 19. Accordingly, image decoding module 101 utilizes a quantization error table 109 as a quantization error matrix in operation 95. Filtering parameters used in operation 95 are provided by obtaining numerical values for $\alpha_k$ and $\beta_k$ from a filter parameter set 75' by means of a decoding parameter table, such as Table II.

Transmission encoded data set 103 is converted into a series of modified coefficient matrices 85, by means of operations 92 and 94, as described above for the preferred embodiment. An estimated scaling factor 107, denoted by $\kappa'$, is obtained as the DC scaled quantization term (i.e., scaled quantization term Q(0,0)in the first row and first column) of quantization table 105, at operation 121. Scaling factor 107 is applied to filter parameter set 75' to produce numerical values for $\alpha_k$ and $\beta_k$ in accordance with Table II.

TABLE II

| Values for α and β Given Estimated Scaling Factor κ' | | | |
|---|---|---|---|
| κ' = DC | $\alpha_y, \beta_y$ | $\alpha_u, \beta_u$ | $\alpha_v, \beta_v$ |
| κ' ≤ 8 | 0 | 0 | 0 |
| 8 < κ' ≤ 24 | 1 | 2 | 2 |
| 24 < κ' ≤ 32 | 2 | 4 | 4 |
| κ' > 32 | 3 | 6 | 6 |

Scaling factor 107 is also applied to quantization-error table 109 from which an estimated quantization error matrix $E_\epsilon(\upsilon,\mu)$, comprising a table of N×N noise-mask terms, is selected. The noise-mask terms contained in quantization error matrices $E_\epsilon(\upsilon,\mu)$ are derived from empirical data and estimation methods and take into account various image attributes typically considered by an image processing operator. Quantization Error Tables III through V are examples of such empirically-derived noise masks used for 8×8 frequency-coefficient matrices.

Estimated quantization error matrix $E_\epsilon(\upsilon,\mu)$ and the numerical values obtained for $\alpha_k$ and $\beta_k$ from filter parameter set 75' are applied with the filtering operation performed on modified coefficient matrix 85, at operation 95, to produce filtered coefficient matrix 87. Reduced-noise digital image 39 is obtained by execution of operations 96, 98, and 99, as in the preferred embodiment.

TABLE III

Quantization Error
Scaling Factor = 2; Y Image-Data Band

| 0.0 | 0.6 | 0.3 | 0.3 | 0.6 | 0.8 | 1.0 | 1.0 |
| 0.6 | 0.6 | 0.3 | 0.6 | 0.6 | 0.8 | 1.1 | 1.2 |
| 0.6 | 0.6 | 0.6 | 0.6 | 0.8 | 1.0 | 1.2 | 1.2 |
| 0.6 | 0.6 | 0.6 | 0.6 | 0.8 | 1.1 | 1.2 | 1.1 |
| 0.6 | 0.6 | 0.6 | 0.8 | 0.9 | 1.0 | 1.2 | 1.0 |
| 0.6 | 0.6 | 0.8 | 1.1 | 1.1 | 1.1 | 1.0 | 0.8 |
| 0.8 | 0.8 | 0.9 | 1.1 | 1.1 | 1.0 | 0.8 | 0.7 |
| 0.8 | 0.9 | 1.1 | 1.1 | 0.9 | 0.9 | 0.7 | 0.6 |

TABLE IV

Quantization
Error Scaling Factor = 8; U Image-Data Band

| 0.0 | 2.2 | 2.2 | 2.6 | 2.7 | 2.2 | 1.7 | 1.5 |
| 2.2 | 2.2 | 2.2 | 2.3 | 2.3 | 1.8 | 1.4 | 1.4 |
| 2.5 | 2.2 | 2.3 | 2.5 | 2.1 | 1.6 | 1.3 | 1.2 |
| 2.7 | 2.5 | 2.6 | 2.3 | 1.7 | 1.4 | 1.2 | 1.1 |
| 3.1 | 2.6 | 2.2 | 1.8 | 1.5 | 1.3 | 1.1 | 1.1 |
| 2.7 | 2.1 | 1.7 | 1.4 | 1.3 | 1.1 | 1.1 | 1.0 |
| 2.1 | 1.8 | 1.5 | 1.2 | 1.1 | 1.0 | 1.0 | 1.0 |
| 1.7 | 1.5 | 1.3 | 1.1 | 1.0 | 1.0 | 1.0 | 1.0 |

TABLE V

Quantization Error
Scaling Factor = 24; V Image-Data Band

| 0.0 | 6.1 | 5.4 | 5.3 | 4.2 | 3.4 | 2.9 | 2.7 |
| 6.1 | 5.9 | 5.0 | 4.3 | 3.5 | 3.0 | 2.6 | 2.5 |
| 6.1 | 5.2 | 4.7 | 4.1 | 3.3 | 2.7 | 2.4 | 2.4 |
| 5.8 | 4.8 | 4.5 | 3.5 | 2.9 | 2.5 | 2.2 | 2.2 |
| 5.3 | 4.3 | 3.4 | 2.8 | 2.4 | 2.2 | 2.0 | 2.0 |
| 3.9 | 3.3 | 2.7 | 2.3 | 2.1 | 2.0 | 2.0 | 1.9 |
| 3.1 | 2.7 | 2.3 | 2.0 | 1.9 | 1.8 | 1.8 | 1.8 |
| 2.5 | 2.3 | 2.0 | 1.8 | 1.7 | 1.7 | 1.7 | 1.7 |

The present invention is advantageously adapted to provide an apparatus which accomplishes moderate levels of image data compression without incurring blocking artifacts in a more efficient method than is presently available in conventional image processing devices. While there have been described preferred embodiments of the present invention, it will be readily apparent to those skilled in the art that various changes and modifications may be made therein without departing from the invention, and it is intended in the wording of the appended claims to include such changes and modifications as would be encompassed by the true spirit and scope of the invention.

What is claimed is:

1. A method for reducing the effects of blocking artifacts attributable to quantization incurred in the transform image coding and compression of a two-dimensional image signal into a digital image, the degree of compression determined by a scaling factor κ and a quantization table, and the image signal provided as a series of electrical signals, each electrical signal corresponding to a characteristic of an element of a two-dimensional image, where the image elements have been configured as a two-dimensional H×V array, said method comprising the steps of:

converting the series of electrical signals into a set of numerical values, each said numerical value quantitatively describing a feature characteristic of a corresponding image element, said numerical values further denoted by $s_0(z,y)$ where $0 \leq y \leq H-1$ and $0 \leq z \leq V-1$;

formatting said set of numerical values into a plurality of N×N image data matrices identified by indices 'p' and 'q', each said image-data matrix comprising image-data terms denoted by $s_{q,p}(j,i)$, each said image data term comprised of a said numerical value determined in accordance with the relationship;

$$s_{q,p}(j,i) = s_0(j+Nq, i+Np)$$

where $0 \leq i,j \leq N-1$;

transforming each said image-data matrix into an N×N frequency-coefficient matrix comprising frequency-coefficient terms denoted by $S_{q,p}(\upsilon,\mu)$, said step of transforming each said image-data matrix accomplished by means of an orthogonal transform basis matrix C in accordance with the expression, $$S_{q,p}(\upsilon,\mu) = C \times s_{q,p}(j,i) \times C^T;$$

dividing each said frequency-coefficient term $S_{q,p}(\upsilon,\mu)$ by a scaled quantization term denoted by $Q(\upsilon,\mu)$, said scaled quantization term obtained from the quantization table and modified by the scaling factor, to yield a plurality of N×N quotient-coefficient matrices comprising quotient terms denoted by $Qu_{q,p}(\upsilon,\mu)$ derived in accordance with the expression, $$Qu_{q,p}(\nu,\mu) = \frac{S_{q,p}(\nu,\mu)}{Q(\nu,\mu)};$$

rounding each said quotient term to a less precise value to yield a quantized-coefficient matrix comprising quantized-quotient terms denoted by $Qc_{q,p}(\upsilon,\mu)$ in accordance with the expression, $$Qc_{q,p}(\nu,\mu) = \text{round}\left(\frac{S_{q,p}(\nu,\mu)}{Q(\nu,\mu)}\right);$$

subtracting each said quantized-coefficient term $Qc_{q,p}(\upsilon,\mu)$ from a corresponding said quotient term $Qu_{q,p}(\upsilon,\mu)$ to form a plurality of N×N difference-coefficient matrices comprising difference terms $Dc_{q,p}(\upsilon,\mu)$ derived in accordance with the expression, $$Dc_{q,p}(\nu,\mu) = abs\left|\left(\frac{S_{q,p}(\nu,\mu)}{Q(\nu,\mu)}\right) - \text{round}\left(\frac{S_{q,p}(\nu,\mu)}{Q(\nu,\mu)}\right)\right|;$$

deriving a quantization error matrix, comprising terms $E_0(\upsilon,\mu)$, by summing and averaging error terms, said error terms comprising functions of said difference-coefficient matrices;

selecting a set of filter parameters, denoted by $\alpha$ and $\beta$;

multiplying each said quantized coefficient term by a corresponding quantization term to yield a plurality of N×N mask-multiplied transform coefficient matrices comprising terms denoted by $R_{q,p}(\upsilon,\mu)$ derived in accordance with the expression, $$R_{q,p}(\upsilon,\mu) = Qc_{q,p}(\upsilon,\mu) \times Q(\upsilon,\mu);$$

applying an inverse orthogonal transform to said mask-multiplied transform coefficient matrices to yield a plurality of N×N received image-data matrices denoted by $r_{q,p}(j,i)$, in accordance with the inverse transform equation, $$r_{q,p}(j,i) = C^T \times R_{q,p}(\upsilon,\mu) \times C;$$

formatting said received image-data matrices into an H×V received image-data set comprising terms denoted by $s_R(z,y)$, in accordance with the equation, $$s_R(j+Nq, i+Np) = r_{q,p}(j,i)$$

where $0 \leq i+Np \leq H-1$ and $0 \leq j+Nq \leq V-1$;

forming said received image data set into a plurality of N×N overlapped image-data matrices comprising terms denoted by $v_{s,r}(j,i)$, in accordance with the equation, $$v_{s,r}(j,i) = s_R(j+\omega s, i+\omega r);$$

transforming said overlapped image-data matrices into modified coefficient matrices comprising terms denoted by $Sv_{s,r}(\upsilon,\mu)$, in accordance with the equation, $$Sv_{s,r}(\upsilon,\mu) = C \times v_{s,r}(j,i) \times C^T;$$

converting said modified coefficient matrices into filtered coefficient matrices by means of said quantization error matrix and said filter parameters, said modified coefficient matrix comprising terms denoted by $Sf_{s,r}(\upsilon,\mu)$, said step of converting said modified coefficient matrices performed in accordance with the equation, $$Sf_{s,r}(\nu,\mu) = [Sv_{s,r}(\nu,\mu)] \times \left[\frac{[Sv_{s,r}(\nu,\mu)]^2}{[Sv_{s,r}(\nu,\mu)]^2 + \alpha[E_0(\nu,\mu)]^2}\right]^{\beta};$$

transforming said filtered coefficient matrices into filtered image-data matrices in accordance with the transform equation, $$rf_{s,r}(j,i) = C^T \times Sf_{s,r}(\upsilon,\mu) \times C; \text{ and}$$

converting said filtered image-data matrices into a series of filtered electrical signals such that said filtered electrical signals can be configured into a two-dimensional H×V array of filtered image elements, each said filtered electrical signal corresponding to a characteristic of one said filtered image element.

2. The method of claim 1 wherein said quantization error matrix $E_0(\upsilon,\mu)$ is determined in accordance with the relationship $$E_0(\nu,\mu) = Q(\nu,\mu) \sum_q \sum_p \frac{DC_{q,p}(\nu,\mu)}{M}.$$

3. The method of claim 1 wherein said quantization error matrix $E_0(\upsilon,\mu)$ is determined in accordance with the relationship $$E_0(v,\mu) = Q(v,\mu) \sqrt{\sum_q \sum_p \frac{(DC_{q,p}(v,\mu))^2}{M}}$$

4. The method of claim 1 wherein said orthogonal transform basis matrix C comprises a discrete cosine transform basis matrix.

5. The method of claim 1 wherein said step of converting said filtered image-data matrices comprises the steps of extracting a core submatrix from each said filtered image-data matrix and combining a plurality of said core submatrices to form said two-dimensional H×V array of filtered image elements.

6. The method of claim 5 wherein said step of extracting a core submatrix comprises deleting image-data terms in rows 0 through $$\left(\frac{\omega}{2} - 1\right)$$

and $$\left(N - \frac{\omega}{2}\right)$$

through (N−1) of said filtered image-data matrix and deleting filtered image-data terms in columns 0 through $$\left(\frac{\omega}{2} - 1\right)$$

and $$\left(N - \frac{\omega}{2}\right)$$

through (N−1) of said filtered image-data matrix.

7. The method of claim 1 wherein ω is set to $$\frac{N}{2}.$$

8. The method of claim 1 wherein N is equal to 8.

9. A method for reducing the effects of blocking artifacts attributable to quantization incurred in the transform image coding and compression of a two-dimensional image signal into a digital image, the degree of compression determined by a scaling factor κ and a quantization table, and the image signal provided as a series of electrical signals, each electrical signal corresponding to a characteristic of an element of a two-dimensional image, where the image elements have been configured as a two-dimensional H×V array, said method comprising the steps of:

- transform image coding the two-dimensional H×V array of image elements to form a coded image-data set by means of an orthogonal transform basis matrix, said step of transform image coding comprising a quantization operation;
- decoding said coded image-data set by means of said orthogonal transform basis matrix to form a decoded image-data set;
- converting said decoded image-data set into a plurality of frequency coefficient terms by means of said orthogonal transform basis matrix;
- filtering said plurality of frequency coefficient terms by means of a filtering computation, said filtering computation comprising the step of multiplying said frequency coefficient terms with a coefficient filtering term to form a plurality of filtered frequency coefficient terms; and
- converting said filtered frequency coefficients into a reduced-noise digital image.

10. The method of claim 9 wherein said step of converting said decoded image-data set comprises the steps of forming said decoded image-data set into an array of overlapped image-data matrices and converting said array of overlapped image-data matrices into an array of frequency coefficient matrices by means of said orthogonal transform basis matrix, said frequency coefficient matrices comprising said frequency coefficient terms.

11. The method of claim 9 further comprising the step of deriving said coefficient filtering term.

12. The method of claim 11 wherein said step of deriving said coefficient filtering term comprises the step of deriving at least one filter parameter.

13. The method of claim 12 wherein said filter parameter is a function of said scaling factor κ.

14. The method of claim 11 wherein said step of deriving said coefficient filtering term comprises the step of deriving a quantization error matrix.

15. The method of claim 9 wherein said orthogonal transform basis matrix comprises a discrete cosine transform basis matrix.

16. The method of claim 9 wherein said step of converting said filtered frequency coefficients comprises the steps of transforming said filtered frequency coefficients into filtered image-data terms by means of said orthogonal transform basis matrix and converting said filtered image-data terms into a series of filtered electrical signals such that said filtered electrical signals can be configured into a two-dimensional H×V array of filtered image elements to form said reduced-noise digital image, each said filtered electrical signal corresponding to a characteristic of one said filtered image element.

17. The method of claim 16 wherein said step of converting said filtered image-data terms comprises the steps of extracting a portion of said filtered image-data terms and combining said portion to form a two-dimensional H×V reduced-noise image-data set from which said reduced-noise digital image is formed.

18. A method for filtering a two-dimensional decoded image signal such that the effects of blocking artifacts attributable to quantization are reduced, the blocking artifacts arising in the decoded image signal as a consequence of there having been performed transform image coding, data compression, and quantization on an antecedent image signal, the antecedent image signal having been provided as a series of electrical signals, each electrical signal corresponding to a characteristic of an element of the antecedent image, where the compression operation utilized a scaling factor κ and quantization terms derived from a quantization table, and where the decoded image signal has been configured as a two-dimensional H×V set of image-data terms denoted by $S_R(z,y)$, said method comprising the steps of:

- defining an overlap parameter, denoted by ω;
- forming the decoded image signal set into a plurality of N×N overlapped image-data matrices comprising terms denoted by $v_{s,r}(j,i)$, in accordance with the relationship, $$v_{s,r}(j,i) = s_R(j+\omega s, i+\omega r);$$

- transforming said overlapped image-data matrices into modified coefficient matrices comprising terms denoted by $Sv_{s,r}(\upsilon,\mu)$, by means of an orthogonal transform basis matrix C in accordance with the matrix equation, $$Sv_{s,r}(\upsilon,\mu)=C \times v_{s,r}(j,i) \times C^T;$$

estimating the scaling factor $\kappa$;

determining filter parameters as a function of said scaling factor, said filter parameters denoted by $\alpha(\kappa)$ and $\eta(\kappa)$;

selecting a quantization error matrix, denoted by $E_0$;

converting said modified coefficient matrices into filtered coefficient matrices by means of said quantization error matrix and said filter parameters, said modified coefficient matrix comprising terms denoted by $Sf_{s,r}(\upsilon,\mu)$, said step of converting said modified coefficient matrices performed in accordance with the equation, $$Sf_{s,r}(v,\mu) = [Sv_{s,r}(v,\mu)] \times \left[ \frac{[Sv_{s,r}(v,\mu)]^2}{[Sv_{s,r}(v,\mu)]^2 + \alpha[E_0(v,\mu)]^2} \right]^\beta ;$$

transforming said filtered coefficient matrices into filtered image-data matrices, denoted by $rf_{s,r}(j,i)$, in accordance with the matrix equation, $$rf_{s,r}(j,i)=C^T \times Sf_{s,r}(\upsilon,\mu) \times C; \text{ and}$$

converting said filtered image-data matrices into a series of filtered electrical signals such that said filtered electrical signals can be configured into a two-dimensional H×V array of filtered image elements to form a reduced-noise digital image, each said filtered electrical signal corresponding to a characteristic of one said filtered image element.

19. The method of claim 18 wherein said orthogonal transform basis matrix C comprises a discrete cosine transform basis matrix.

20. The method of claim 18 wherein said step of converting said filtered image-data matrices comprises the steps of extracting a core submatrix from each said filtered image-data matrix and combining a plurality of said core submatrices to form a two-dimensional H×V reduced-noise image-data set from which said reduced-noise digital image is formed.

21. The method of claim 20 wherein said step of extracting a core submatrix comprises deleting image-data terms in rows 0 through $$\left( \frac{\omega}{2} - 1 \right)$$

and $$\left( N - \frac{\omega}{2} \right)$$

through (N−1) of said filtered image-data matrix and deleting filtered image-data terms in columns 0 through $$\left( \frac{\omega}{2} - 1 \right)$$

and $$\left( N - \frac{\omega}{2} \right)$$

through (N−1) of said filtered image-data matrix.

22. The method of claim 18 wherein $\omega$ is set to $$\frac{N}{2}.$$

23. The method of claim 18 wherein said step of estimating a scaling factor K comprises the step of setting K equal to the DC scaled quantization term of said quantization table.

24. The method of claim 18 wherein said step of determining filter parameters comprises the step of obtaining at least one of said filter parameters from a numerical table.

25. The method of claim 18 wherein $\kappa \leq 8$ and $\alpha(\kappa)=\beta(\kappa)=0$.

26. The method of claim 18 wherein $8 \leq \kappa \leq 24$ and $\alpha(\kappa)$, $\alpha(78) \geq 1$.

27. The method of claim 18 wherein $24 \leq \kappa \leq 32$ and $\alpha(\kappa)$, $\beta(\kappa) \geq 2$.

28. The method of claim 18 wherein $\kappa > 32$ and $\alpha(\kappa)$, $\beta(\kappa) \geq 3$.

29. The method of claim 18 wherein said step of selecting a quantization error matrix comprises the step of obtaining at least one quantization error term from a numerical table.

30. A method for filtering a two-dimensional decoded image signal such that the effects of blocking artifacts attributable to quantization are reduced, the blocking artifacts arising in the decoded image signal as a consequence of there having been performed transform image coding, data compression, and quantization on an antecedent image signal, the antecedent image signal having been provided as a series of electrical signals, each electrical signal corresponding to a characteristic of an element of the antecedent image, where the compression operation utilized a scaling factor and quantization terms obtained from a quantization table, and where the decoded image signal has been configured as a two-dimensional H×V set of image-data terms denoted by $s_R(z,y)$, said method comprising the steps of:

converting said set of image-data terms into a plurality of frequency coefficient terms by means of an orthogonal transform basis matrix;

filtering said plurality of frequency coefficient terms by means of a filtering computation, said filtering computation comprising the step of multiplying said frequency coefficient terms with a coefficient filtering term to form a plurality of filtered frequency coefficient terms; and converting said filtered frequency coefficients into a reduced-noise digital image.

31. The method of claim 30 wherein said step of converting said set of image-data terms comprises the steps of forming said image-data terms into an array of overlapped image-data matrices and converting said array of overlapped image-data matrices into an array of coefficient matrices comprising frequency coefficient terms by means of said orthogonal transform basis matrix.

32. The method of claim 30 further comprising the step of deriving said coefficient filtering term.

33. The method of claim 32 wherein said step of deriving said coefficient filtering term comprises the step of deriving at least one filter parameter.

34. The method of claim 33 wherein said filter parameter is a function of the scaling factor.

35. The method of claim 32 wherein said step of deriving said coefficient filtering term comprises the step of deriving a quantization error matrix.

36. The method of claim 30 wherein said step of converting said filtered frequency coefficients comprises the steps of transforming said filtered frequency coefficients into filtered image-data terms by means of said orthogonal transform basis matrix and converting said filtered image-data terms into a series of filtered electrical signals such that said filtered electrical signals can be configured into a two-dimensional H×V array of filtered image elements to form said reduced-noise digital image, each said filtered electrical signal corresponding to a characteristic of one said filtered image element.

37. The method of claim 36 wherein said step of converting said filtered image-data terms comprises the steps of extracting a portion of said filtered image-data terms and combining said portion to form a two-dimensional H×V reduced-noise image-data set from which said reduced-noise digital image is formed.

38. An image processing apparatus for reducing the effects of blocking artifacts attributable to quantization incurred in the transform image coding and compression of a two-dimensional image signal into a digital image, the degree of compression determined by a scaling factor and a quantization table, and the image signal provided as a series of electrical signals, each electrical signal corresponding to a characteristic of an element of a two-dimensional image, where the image elements have been configured as a two-dimensional H×V array, said apparatus comprising:

means for applying an orthogonal transform basis matrix to the two-dimensional H×V array of image elements so as to form a coded image-data set comprising quantized terms;

means for applying said orthogonal transform basis matrix to said coded image-data set so as to form a decoded image-data set;

means for transform image coding said decoded image-data set into a plurality of frequency coefficient terms;

filtering means, operative on said frequency coefficient terms such that said frequency coefficient terms are multiplied by a coefficient filtering term to form a plurality of filtered frequency coefficient terms; and means for converting said filtered frequency coefficients into a reduced-noise digital image.

39. The image processing apparatus of claim 38 wherein said means for transform image coding said decoded image-data set comprises means for forming said decoded image-data set into an array of overlapped image-data matrices and means for transform image coding said array of overlapped image-data matrices into an array of frequency coefficient matrices comprising said frequency coefficient terms.

40. The image processing apparatus of claim 38 further comprising means for deriving said coefficient filtering term.

41. The image processing apparatus of claim 40 wherein said means for deriving said coefficient filtering term comprises means for providing a quantization error matrix.

42. The image processing apparatus of claim 41 wherein said means for providing a quantization error matrix comprises a numerical table.

43. The image processing apparatus of claim 38 wherein said orthogonal transform basis matrix comprises a discrete cosine transform basis matrix.

44. The image processing apparatus of claim 38 wherein said means for converting said filtered frequency coefficients comprises means for transform image coding said filtered frequency coefficients into filtered image-data terms and means for converting said filtered image-data terms into a series of filtered electrical signals such that said filtered electrical signals can be configured into a two-dimensional H×V array of filtered image elements to form said reduced-noise digital image, each said filtered electrical signal corresponding to a characteristic of one said filtered image element.

45. The image processing apparatus of claim 44 wherein said means for converting said filtered image-data terms comprises means for extracting a portion of said filtered image-data terms and means for combining said portion to form a two-dimensional H×V reduced-noise image-data set from which said reduced-noise digital image is formed.

46. An image processing apparatus for filtering a two-dimensional decoded image signal such that the effects of blocking artifacts attributable to quantization are reduced, the blocking artifacts arising in the decoded image signal as a consequence of there having been performed transform image coding, data compression, and quantization on an antecedent image signal, the antecedent image signal having been provided as a series of electrical signals, each electrical signal corresponding to a characteristic of an element of the antecedent image, where the compression operation utilized a scaling factor and quantization terms obtained from a quantization table, and where the decoded image signal has been configured as a two-dimensional H×V set of image-data terms denoted by $S_R(z,y)$, said apparatus comprising:

means for transform image coding said set of image-data terms into a plurality of frequency coefficient terms by means of an orthogonal transform basis matrix;

filtering means, operative on said frequency coefficient terms such that said frequency coefficient terms are multiplied by a coefficient filtering term to form a plurality of filtered frequency coefficient terms; and means for converting said filtered frequency coefficients into a reduced-noise digital image.

47. The image processing apparatus of claim 46 wherein said means for transform image coding said set of image-data terms comprises means for forming said image-data terms into an array of overlapped image-data matrices and means for transform image coding said array of overlapped image-data matrices into an array of frequency coefficient matrices comprising said frequency coefficient terms.

48. The image processing apparatus of claim 46 further comprising means for deriving said coefficient filtering term.

49. The image processing apparatus of claim 48 wherein said means for deriving said coefficient filtering term comprises means for providing a quantization error matrix.

50. The image processing apparatus of claim 49 wherein said means for providing a quantization error matrix comprises a numerical table.

51. The image processing apparatus of claim 46 wherein said means for converting said filtered frequency coefficients comprises means for transform image coding said filtered frequency coefficients into filtered image-data terms and means for converting said filtered image-data terms into a series of filtered electrical signals such that said filtered electrical signals can be configured into a two-dimensional H×V array of filtered image elements to form said reduced-noise digital image, each said filtered electrical signal corresponding to a characteristic of one said filtered image element.

52. The image processing apparatus of claim 51 wherein said means for converting said filtered image-data terms comprises means for extracting a portion of said filtered image-data terms and means for combining said portion to form a two-dimensional H×V reduced-noise image-data set from which said reduced-noise digital image is formed.

* * * * *